G. S. ADAMS.

HINGED SPLINTS.

No. 186,700.  Patented Jan. 30, 1877.

WITNESSES:
A. W. Almquist
J. H. Scarborough

INVENTOR:
G. S. Adams
BY
ATTORNEYS.

UNITED STATES PATENT OFFICE.

GEORGE S. ADAMS, OF PHILADELPHIA, PENNSYLVANIA.

IMPROVEMENT IN HINGED SPLINTS.

Specification forming part of Letters Patent No. 186,700, dated January 30, 1877; application filed January 13, 1877.

*To all whom it may concern:*

Figure 1:
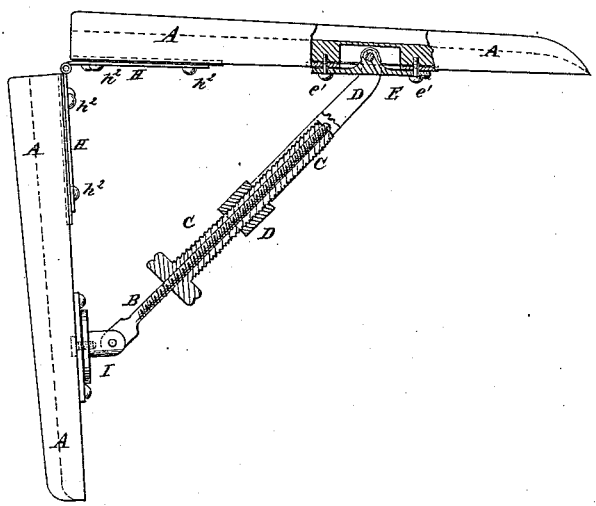
Figure 2:
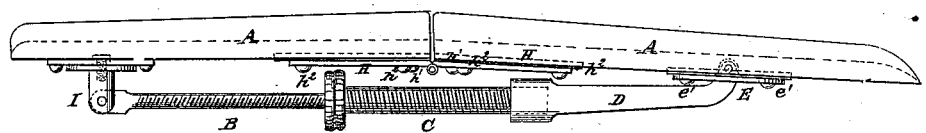
Figure 3:
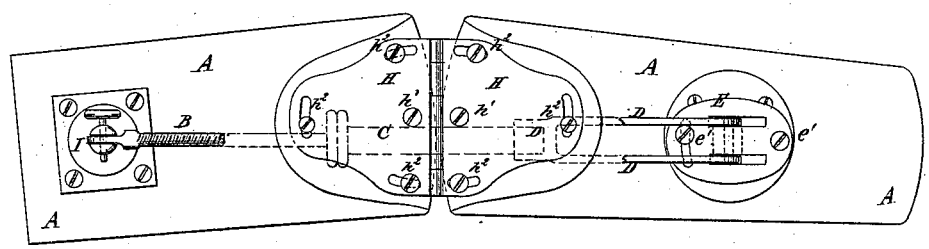

Be it known that I, GEORGE S. ADAMS, M. D., of Philadelphia, in the county of Philadelphia and State of Pennsylvania, have invented a new and useful Improvement in Hinged Splint, of which the following is a specification:

Figure 1 is an edge view of my improved splint adjusted at right angles, and parts being broken away to show the construction. Fig. 2 is an edge view of the same extended in line. Fig. 3 is a front view of the same.

Similar letters of reference indicate corresponding parts.

The object of this invention is to furnish an improved hinged splint which shall be so constructed that it may be easily and gradually extended and contracted, as may be required, may be adjusted to the right or left at such an angle as the angle of the limbs may require, and which shall be simple in construction, neat in appearance, and convenient in use.

The invention consists in the combination of the screw having a right-hand screw-thread formed upon its outer surface, and a left-hand screw-thread formed upon its inner surface, with the left-hand screw pivoted to one part of the hinged splint, and with the long nut pivoted to the other part of said splint; and in the combination of the slotted hinge, the swiveled stud, and the slotted plate with the arms of the splint, the two screws, and the long nut, as hereinafter fully described.

A is a splint, which may be of any convenient size, and which is made in two parts, connected to each other at their adjacent ends by a hinge, H. The plates of the hinge H are secured to the arms of the splint A, or to plates attached to said arms by screws $h^1$ $h^2$, the screws $h^1$ serving as pivots for the arms of the splint A, and the screws $h^2$ passing through curved slots in the hinge-plates, to strengthen the connection and limit the movement. When the arms of the splint A have been adjusted at the proper lateral angle, they may be secured in place by tightening the screws $h^2$.

To one part of the splint A is swiveled a stud, I, to which is hinged the end of a screw, B, which has a left-hand screw-thread cut upon it, and which screws into a left-hand screw-thread formed in the inner surface of the hollow screw C. The hollow screw C has a milled disk or head formed upon its inner end, and has a right-hand screw-thread formed upon its outer surface.

The screw C is screwed into a nut, D, which is made with two parallel arms, forming a long nut. The outer ends of the arms of the nut D are bent downward, are passed through slots in a plate, E, attached to the other part of the splint A, and are pivoted to lugs formed upon the inner side of the said plate. The plate E has a short slot formed through it to receive one of the screws $e'$, by which it is secured to the splint A, or to a plate attached to said splint, to allow the said plate to turn to correspond with the lateral angle of the arms of the splint at its hinge H.

By this construction, by turning the screw C in one direction the parts of the splint A are drawn toward each other at an angle, and by turning it in the other direction the said parts are pushed from each other toward a straight line.

This construction enables the splint to be adjusted in any desired position from a straight line to an acute angle, and enables it to be gradually and gently extended or contracted, according as the limb to which it is applied requires to be straightened or bent, while the lateral adjustment of the arms of the splint enables it to be adjusted to the natural lateral angle of the limb, enabling the limb to be secured in its natural, and thus in its easiest, position.

Having thus described my invention, I claim as new and desire to secure by Letters Patent—

1. The combination of the screw C, having a right-hand screw-thread formed upon its outer surface, and a left-hand screw-thread formed upon its inner surface, with the left-hand screw B, pivoted to one part of the hinged splint A, and with the long nut D, pivoted to the other part of said splint, substantially as herein shown and described.

2. The combination of the slotted hinge H, the swiveled stud I, and the slotted plate E with the arms of the splint A, the screws B and C, and the long nut D, substantially as herein shown and described.

GEORGE S. ADAMS.

Witnesses:
FRANCIS E. WILCOX,
CHAS. M. THOMAS.